Sept. 9, 1924.

J. E. McWILLIAM 1,507,617

SIGNAL DEVICE FOR AUTOMOBILES

Filed Aug. 31, 1923

Inventor
J. E. McWilliam
By Attorneys.
Southgate & Southgate.

Patented Sept. 9, 1924.

1,507,617

UNITED STATES PATENT OFFICE.

JAMES E. McWILLIAM, OF NORTH OXFORD, MASSACHUSETTS.

SIGNAL DEVICE FOR AUTOMOBILES.

Application filed August 31, 1923. Serial No. 660,449.

*To all whom it may concern:*

Be it known that I, JAMES E. MCWILLIAM, a citizen of the United States, residing at North Oxford, in the county of Worcester and State of Massachusetts, have invented a new and useful Signal Device for Automobiles, of which the following is a specification.

This invention relates to a device adapted to be carried by an automobile for in an accurate manner indicating to an approaching car having a headlight the position of the automobile on which the signal is mounted.

The principal objects of the invention are to provide for accomplishing this result in the simplest possible way without the addition of any more lights than are ordinarily used, or the modification of those now employed and practically without the employment of additional mechanism of any kind; and to provide a device which will be readily observable under ordinary conditions now existing on the road. Other objects and advantages of the invention will appear hereinafter.

Reference is to be had to the accompanying drawings, in which

It is well known that every automobile carries strong headlights which enable the driver to see objects in front much better than has ever been the case heretofore, and that these are required in practically all States. I take advantage of that fact to provide a signal device which is lighted up, not by the lights on the car that carries it, but by the lights on the car approaching either in front or from the rear, especially in front.

Figure 1:
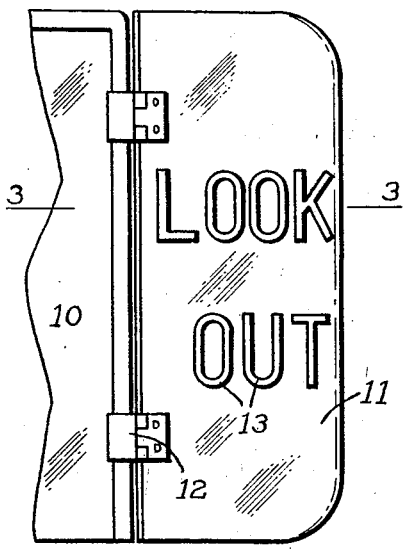
Fig. 1 is a front view of an automobile wind shield with one embodiment of this invention applied thereto, showing it as it looks to an approaching car meeting the one on which the signal is located.
Figure 2:
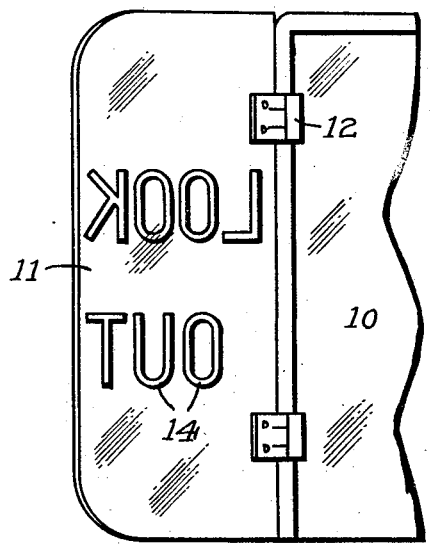
Fig. 2 is a rear view of the same showing how the signal looks to a car approaching from behind.
Figure 3:
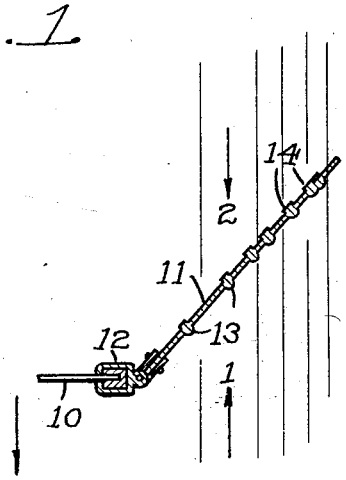
Fig. 3 is a sectional view on the line 3—3 of Fig. 1.

For this purpose I apply a wind shield 10 to the front of the car if it is a closed car, or use the side wind shield 11 such as is well known at the present time. By means of any convenient supporting means 12 it is located at an angle as shown in Fig. 3 in the usual way. It is made of plain plate glass, preferably transparent and uncolored.

On the front of it I place a danger signal consisting of any desired words, characters, or illustrations, and formed of raised areas 13 colored in such a way as to indicate danger, as for example red or green. I prefer to make the bodies of these areas convex on the front as indicated in Fig. 3 so that light coming from various directions in front will show up the red parts. The red surfaces cover only the convex portions.

It will be seen that an automobile approaching from the front no matter whether the car on which the sign is carried is moving forward, backward, or standing still, will light up this sign by means of its headlights and throw it out in bold relief so that the driver will not fail to see it. Furthermore, even pedestrians in crossing will always see it if any car is approaching from the front.

In order that the sign may be seen easily from the rear I prefer to provide block letters 14 on the rear instead of rounding them as on the front. They are in registration with the colored convex areas in front. They project and will not need any extra red or green surface, because of the surfaces on the front side.

Now a car approaching from the rear will light up this rear surface and show the danger signal. The fact that the lettering of the words is reversed will be of small consequence. This lighting from the rear will show that there is a car in front and show where it is, because as soon as these are known everybody will understand that they are on the left-hand side shield. The appearance of the sign will be so different from its appearance in front that nobody will fail to know which way the car is headed and where it is located. Furthermore, in case of light being shown on this shield both from the front and rear this will not diminish the distinctness of the sign in front, and not materially diminish the view of it from the back because then it shows up clearly on account of the strong light at the front.

In this way with the addition of no real mechanism and nothing to get out of order and a mere slight increase in the cost of the side wind shield which is being used more and more every day, an additional safety device is provided of very great importance at night. It is not intended to do away with all other safety devices, but is an additional precaution. It is not unsightly in the day time and involves no extra weight on the car.

Although I have illustrated and described only a single form of the invention I am aware of the fact that many modifications can be made therein by any person skilled in the art without departing from the scope thereof as expressed in the claims. Therefore, I do not wish to be limited to the particular form shown and described, but what I do claim is:—

1. As an article of manufacture, a danger signal for an automobile, consisting of a side wind shield of light transmitting glass having a single device on the front consisting of projecting characters provided with front surfaces of contrasting color showing the presence of the automobile to any one approaching without preventing the passage of light through other parts of the wind shield and having registering projecting characters on the back surface.

2. As an article of manufacture, a danger signal for an automobile, consisting of a side wind shield of transparent plate glass having a signal device on the front consisting of projecting characters provided with front convex colored light transmitting surfaces for the purpose described.

3. As an article of manufacture, a danger signal for an automobile, consisting of a side wind shield of transparent plate glass having a single device on the front consisting of projecting characters provided with front convex surfaces of contrasting color for the purpose described, and having on the rear uncolored characters in block form registering with those on the front for the purpose described.

In testimony whereof I have hereunto affixed my signature.

JAMES E. McWILLIAM.